United States Patent
Sugawara et al.

(10) Patent No.: US 8,433,527 B2
(45) Date of Patent: Apr. 30, 2013

(54) ELECTROMAGNETIC FLOW METER

(75) Inventors: Fujikazu Sugawara, Musashino (JP); Tooru Shimura, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 205 days.

(21) Appl. No.: 12/786,840

(22) Filed: May 25, 2010

(65) Prior Publication Data

US 2010/0300211 A1  Dec. 2, 2010

(30) Foreign Application Priority Data

May 28, 2009 (JP) ................................. 2009-129229

(51) Int. Cl.
 *G01F 1/60* (2006.01)
(52) U.S. Cl.
 USPC .............................. 702/45; 702/50; 702/100
(58) Field of Classification Search .............. 702/33–35, 702/45, 50, 100; 73/861.08, 861.09, 861.11, 73/861.12, 861.13; 324/306, 307, 309
 See application file for complete search history.

(56) References Cited

U.S. PATENT DOCUMENTS

| | | | |
|---|---|---|---|
| 5,271,280 A | 12/1993 | Nissen | |
| 2003/0029249 A1 | 2/2003 | Keech | |
| 2009/0120204 A1 * | 5/2009 | Mitsutake | ................. 73/861.16 |

FOREIGN PATENT DOCUMENTS

| | | |
|---|---|---|
| JP | 63-217226 A | 9/1988 |
| JP | 3-118419 A | 5/1991 |
| JP | 03-060027 U | 6/1991 |
| JP | 03-186716 A | 8/1991 |
| JP | 3-90028 U | 9/1991 |
| JP | 03-257327 A | 11/1991 |
| JP | 05-45195 A | 2/1993 |
| JP | 06-174513 A | 6/1994 |

OTHER PUBLICATIONS

European Search Report issued on Feb. 25, 2011 in the corresponding European Patent Application No. 10163991.2.
Japanese Office Action issued on Apr. 14, 2011 in the corresponding Japanese Patent Application No. 2009-129229.

* cited by examiner

*Primary Examiner* — Sujoy Kundu
(74) *Attorney, Agent, or Firm* — Sughrue Mion, PLLC

(57) ABSTRACT

There is provided an electromagnetic flow meter that applies magnetic fields with a first frequency and a second frequency, to a fluid to be measured, calculates a first flow rate, calculates a second flow rate, performs low-pass filtering on the first flow rate to calculate a first low-pass filtered flow rate, and performs low-pass filtering on the second flow rate to calculate a second low-pass filtered flow rate, the electromagnetic flow meter including: an abnormality detecting unit that detects an abnormal state in which, the fluid is at non-full level on the basis of at least one of the first flow rate and the second flow rate; and an abnormality removing unit that removes the abnormal state on the basis of the first low-pass filtered flow rate and the second low-pass filtered flow rate, when the abnormality detecting unit does not determine that the fluid is in the abnormal state.

10 Claims, 9 Drawing Sheets

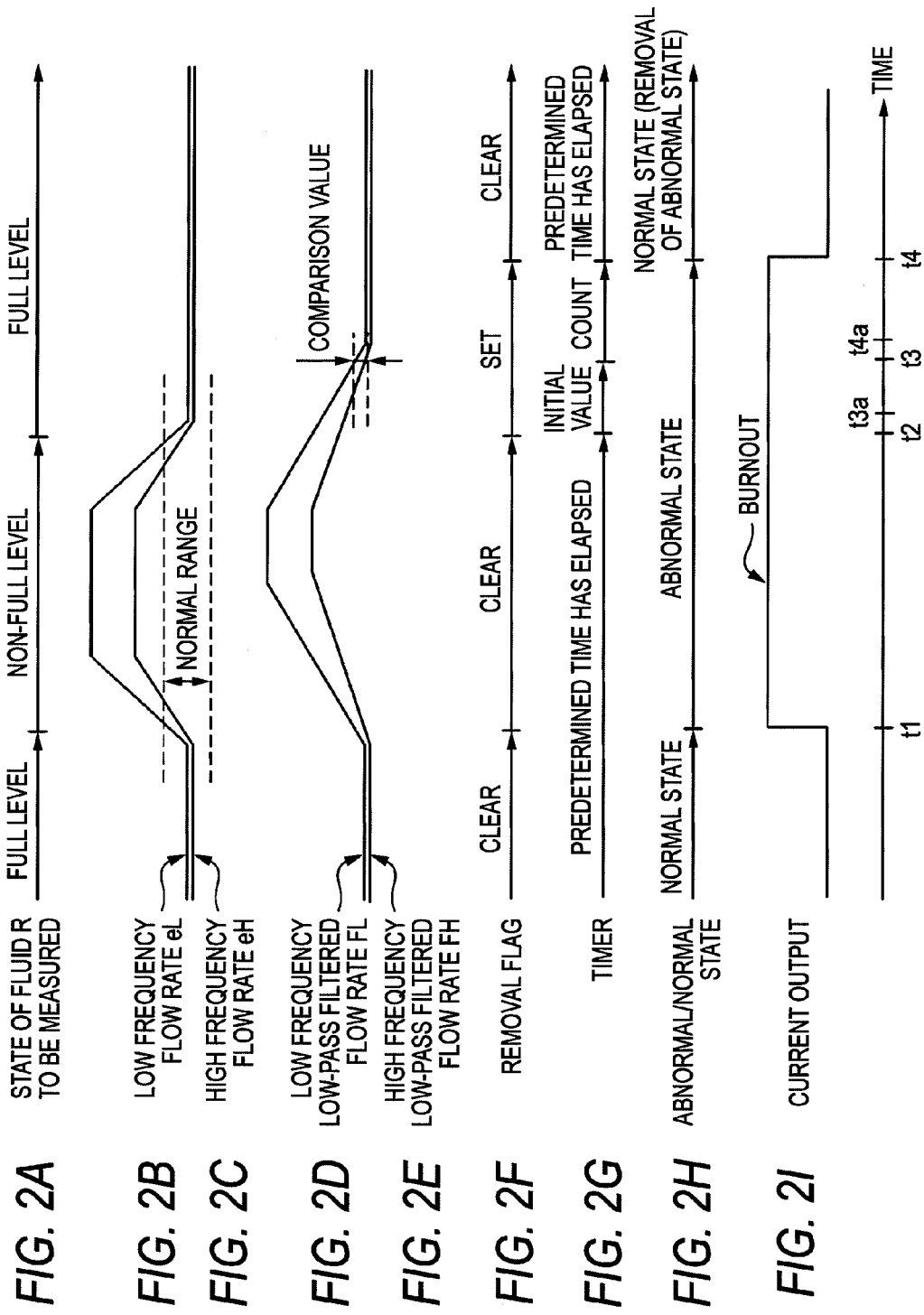

ELECTROMAGNETIC FLOW METER

CROSS-REFERENCE TO RELATED APPLICATION

This application is based on and claims priority under 35 U.S.C. §119 from Japanese Patent Application No. 2009-129229 filed on May 28, 2009.

BACKGROUND OF THE INVENTION

1. Technical Field

The present invention relates to an electromagnetic flow meter, and more particularly, to a two-frequency-excitation-type electromagnetic flow meter that detects the non-full level of a fluid to be measured.

2. Description of the Related Art

In flow control performed in chemical plants, as the excitation type of an electromagnetic flow meter that is used to measure the flow rate of a fluid, generally, a composite excitation type (hereinafter, a 'two-frequency excitation type') has been known in which an excitation current component with a high frequency (first frequency) and an excitation current component with a frequency (second frequency) lower than the first frequency flow through an exciting coil at the same time to form a composite magnetic field. FIG. 8 is a diagram illustrating the structure of a two-frequency-excitation-type electromagnetic flow meter 1. The structure and operation of the electromagnetic flow meter 1 will be described with reference to FIG. 1.

In FIG. 8, the electromagnetic flow meter 1 includes a detector 10, an exciting circuit 20, an amplifying circuit 30, an A/D (analog/digital) converter 31, a constant current circuit 40, and a CPU (central processing unit) 50.

The detector 10 includes an exciting coil 11 and electrodes 12 and 13. The CPU 50 includes a high frequency flow rate calculating unit 51, a low frequency flow rate calculating unit 52, a two-frequency flow rate calculating unit 53, a non-full level detecting unit 54, and an output unit 55.

The electrodes 12 and 13 are provided in the detector 10, and the exciting coil 11 is provided such that the magnetic field generated from the electrodes is applied to a fluid R to be measured in the detector 10.

The outputs of the electrodes 12 and 13 are input to the amplifying circuit 30, and the amplifying circuit 30 amplifies the difference between the outputs of the electrodes 12 and 13 and outputs the amplified signal to the A/D converter 31. The A/D converter 31 converts the differential amplification signal into a digital signal and outputs the digital signal to the CPU 50.

An output terminal of the constant current circuit 40 is connected to the electrodes 12 and 13. For example, the constant current circuit 40 includes two diodes (not shown). An anode of each diode is connected to a predetermined voltage and a cathode thereof is connected to the electrode 12 or 13. In the constant current circuit 40, a leakage current (hereinafter, referred to as a 'constant current') flows to the electrodes 12 and 13 in the opposite direction of the diode.

The high frequency flow rate calculating unit 51 and the low frequency flow rate calculating unit 52 in the CPU 50 receive the digital signal from the A/D converter 31 and calculate the flow rate of the fluid R to be measured corresponding to the excitation frequency.

The two-frequency flow rate calculating unit 53 receives the flow rates calculated by the high frequency flow rate calculating unit 51 and the low frequency flow rate calculating unit 52 and calculates the flow rate of the fluid R to be measured corresponding to two-frequency excitation.

The non-full level detecting unit 54 receives the outputs of the electrodes 12 and 13 when a constant current flows from the constant current circuit 40 to the electrodes 12 and 13 through the amplifying circuit 30 and the A/D converter 31 and detects whether the fluid R to be measured is at a non-full level in the detector 10.

The output unit 55 receives the flow rate calculated by the two-frequency flow rate calculating unit 53 and the detection signal detected by the non-full level detecting unit 54. Then, the output unit 55 outputs a current signal that corresponds to the flow rate or indicates the non-full level.

Next, the operation of the electromagnetic flow meter 1 measuring the flow rate and detecting the non-full level will be described. The exciting circuit 20 makes an excitation current (two-frequency excitation current), which is the sum of a high frequency excitation current and a low frequency excitation current, flow to the exciting coil 11 on the basis of the excitation control signal from the CPU 50, thereby generating a magnetic field from the exciting coil 11. The exciting coil 11 applies a magnetic field corresponding to the excitation current to the fluid R to be measured.

The electrodes 12 and 13 detect and output a signal (electromotive force) that corresponds to a flow velocity and the magnetic field and is generated by the magnetic field corresponding to the high frequency excitation current and the low frequency excitation current.

The CPU 50 receives the signals output from the electrodes 12 and 13 through the amplifying circuit 30 and the A/D converter 31.

The high frequency flow rate calculating unit 51 in the CPU 50 performs a predetermined operation on the received signal in synchronization with a high frequency to calculate a flow rate eH (a first flow rate; hereinafter, referred to as a 'high frequency flow rate') corresponding to high-frequency excitation. The high frequency flow rate calculating unit 51 performs a low-pass operation on the high frequency flow rate eH to calculate a high frequency low-pass filtered flow rate FH (first low-pass filtered flow rate).

The low frequency flow rate calculating unit 52 performs a predetermined operation on the received signal in synchronization with a low frequency to calculate a flow rate eL (a second flow rate; hereinafter, referred to as a 'low frequency flow rate') corresponding to low-frequency excitation. The low frequency flow rate calculating unit 52 performs a low-pass operation on the low frequency flow rate eL to calculate a low frequency low-pass filtered flow rate FL (second low-pass filtered flow rate).

The two-frequency flow rate calculating unit 53 adds the high frequency low-pass filtered flow rate FH and the low frequency low-pass filtered flow rate FL in synchronization with the high frequency to calculate a flow rate eA (a third flow rate; hereinafter, referred to as a 'two-frequency flow rate') corresponding to two-frequency excitation.

The output unit 55 outputs a current signal (for example, in the range of 4 to 20 mA) or a voltage signal (for example, in the range of 1 to 5 V) corresponding to the two-frequency flow rate eA.

The following two methods are used to detect whether the fluid is at a non-full level in the non-full level detecting unit 54.

(1) First, a method of making a constant current flow from the constant current circuit 40 to the electrodes 12 and 13 will be described. When a constant current flows with the fluid R to be measured at a non-full level, the difference (differential voltage) between the output voltages of the electrodes 12 and 13 is higher than that when the fluid is at a full level.

The non-full level detecting unit 54 compares the differential voltage with a predetermined detection voltage. When the differential voltage is higher than the predetermined detection voltage, it is detected that the fluid is at the non-full level. The method of detecting the non-full level is disclosed in JP-A-3-186716.

In addition, an AC coupling circuit (for example, a capacitor (not shown)) for attenuating a DC component may be connected to the outputs of the electrodes 12 and 13. The connection of the capacitor is disclosed in JP-A-6-174513.

(2) A method of detecting whether the fluid is at a non-full level on the basis of a noise component overlapped with the output signals from the electrodes 12 and 13 will be described. In this method, the constant current circuit 40 may not be used.

When the fluid R to be measured is at the non-full level, the level of noise overlapped with the output signals from the electrodes 12 and 13 is more than that when the fluid is at a full level. For example, the noise includes commercial power supply frequency noise and inductive noise generated by the magnetic field generated from the exciting coil 11.

The non-full level detecting unit 54 measures the level (voltage) of noise overlapped with the output signals from the electrodes 12 and 13. When the level of noise is more than a predetermined detection voltage, it is determined that the fluid is at the non-full level. The method of detecting the non-full level is disclosed in JP-A-3-257327 and JP-A-3-60027U.

Next, the operation of the output unit 55 when a non-full level detection signal is received from the non-full level detecting unit 54 will be described.

When the fluid is at the non-full level, the electromagnetic flow meter 1 is in an abnormal state in which it is difficult to accurately measure the flow rate. In this case, in order to notify the abnormal state in which the fluid is at the non-full level to the outside, the output unit 55 outputs a current or voltage signal that is beyond the normal range (hereinafter, referred to as 'burnout') or outputs a warning signal, such as warning light or warning sound.

However, the above-mentioned two methods of detecting the non-full level have the following problems.

(1) In the method of making a constant current flow, when the AC coupling circuit is used, the following problems arise. When the fluid is changed from the full level to the non-full level or from the non-full level to the full level, the outputs of the electrodes 12 and 13 vary greatly.

Therefore, it takes a long time for the output of the AC coupling circuit to be stabilized by a differential operation and the non-full level detecting unit 54 detects the full level and the non-full level after the outputs are stabilized. Therefore, it takes a long time to detect the full level and the non-full level (for example, about 10 minutes).

(2) In the method of detecting the full level and the non-full level from the noise component, for example, when the level of noise generated by a noise source is reduced by a surrounding environment, the level of noise overlapped with the output signals from the electrodes 12 and 13 is less than a predetermined detection voltage even when the fluid is at the non-full level. Therefore, it is difficult for the non-full level detecting unit 54 to detect the non-full level.

In this case, the output unit 55 does not receive a non-full level detection signal. Therefore, the output unit 55 outputs a current or voltage signal corresponding to the two-frequency flow rate eA without burning out the current or the voltage. However, actually, since the fluid is at the non-full level and the output signals from the electrodes 12 and 13 vary greatly, a hunting phenomenon in which the current or voltage output alternates between the upper limit and the lower limit occurs.

SUMMARY OF THE INVENTION

An object of the invention provides a two-frequency-excitation-type electromagnetic flow meter capable of accurately and rapidly detecting the non-full level of a fluid to be measured and preventing output hunting due to the detection of the non-full level.

In order to achieve the object, according to a first aspect of the invention, there is provided an electromagnetic flow meter that applies magnetic fields with a first frequency and a second frequency lower than the first frequency, to a fluid to be measured, calculates a first flow rate on the basis of a signal generated by a first magnetic field with the first frequency, calculates a second flow rate on the basis of a signal generated by a second magnetic field with the second frequency, performs low-pass filtering on the first flow rate to calculate a first low-pass filtered flow rate, and performs low-pass filtering on the second flow rate to calculate a second low-pass filtered flow rate, the electromagnetic flow meter including:

an abnormality detecting unit that detects an abnormal state in which, the fluid to be measured is at non-full level on the basis of at least one of the first flow rate and the second flow rate; and an abnormality removing unit that removes the abnormal state on the basis of the first low-pass filtered flow rate and the second low-pass filtered flow rate, when the abnormality detecting unit does not determine that the fluid to be measured is in the abnormal state.

According to a second aspect of the invention, there is provided the electromagnetic flow meter according to the first aspect, wherein the abnormality removing unit removes the abnormal state when difference between the first low-pass filtered flow rate and the second low-pass filtered flow rate is less than a predetermined value.

According to a third aspect of the invention, there is provided the electromagnetic flow meter according to the second aspect, wherein the abnormality removing unit removes the abnormal state after a first predetermined time has elapsed when difference between the first low-pass filtered flow rate and the second low-pass filtered flow rate is less than the predetermined value.

According to a fourth aspect of the invention, there is provided the electromagnetic flow meter according to the second or third aspect, wherein the abnormality removing unit changes the predetermined value.

According to a fifth aspect of the invention, there is provided the electromagnetic flow meter according to any one of the first to fourth aspects, further including:

a low-pass filtered flow rate setting unit that sets values to the first low-pass filtered flow rate and the second low-pass filtered flow rate after a second predetermined time has elapsed when the abnormality removing unit does not remove the abnormal state.

According to a sixth aspect of the invention, there is provided the electromagnetic flow meter according to the fifth aspect, wherein the low-pass filtered flow rate setting unit sets the first flow rate to the first low-pass filtered flow rate and the second flow rate to the second low-pass filtered flow rate.

According to a seventh aspect of the invention, there is provided the electromagnetic flow meter according to any one of the first to fourth aspects, further including:

a time constant changing unit that changes a time constant used in the low-pass filtering for calculating the first low-pass filtered flow rate and the second low-pass filtered flow rate after a third predetermined time has elapsed when the abnormality removing unit does not remove the abnormal state.

According to an eighth aspect of the invention, there is provided the electromagnetic flow meter according to any one of the first to seventh aspects, wherein the abnormality detecting unit detects that the fluid to be measured is in the abnormal state when at least one of the first flow rate and the second flow rate is out of a predetermined range.

BRIEF DESCRIPTION OF THE DRAWINGS

A general architecture that implements the various features of the invention will now be described with reference to the drawings. The drawings and the associated descriptions are provided to illustrate embodiments of the invention and not limited the scope of the invention.

FIGS. 2A to 2I are timing chart illustrating the operation of the electromagnetic flow meter shown in FIG. 1 when a fluid to be measured is at a full level and a non-full level.

DETAILED DESCRIPTION OF THE PREFERRED EMBODIMENTS

Various embodiments according to the invention will be described hereinafter with reference to the accompanying drawings.
(First Embodiment)

Figure 1:
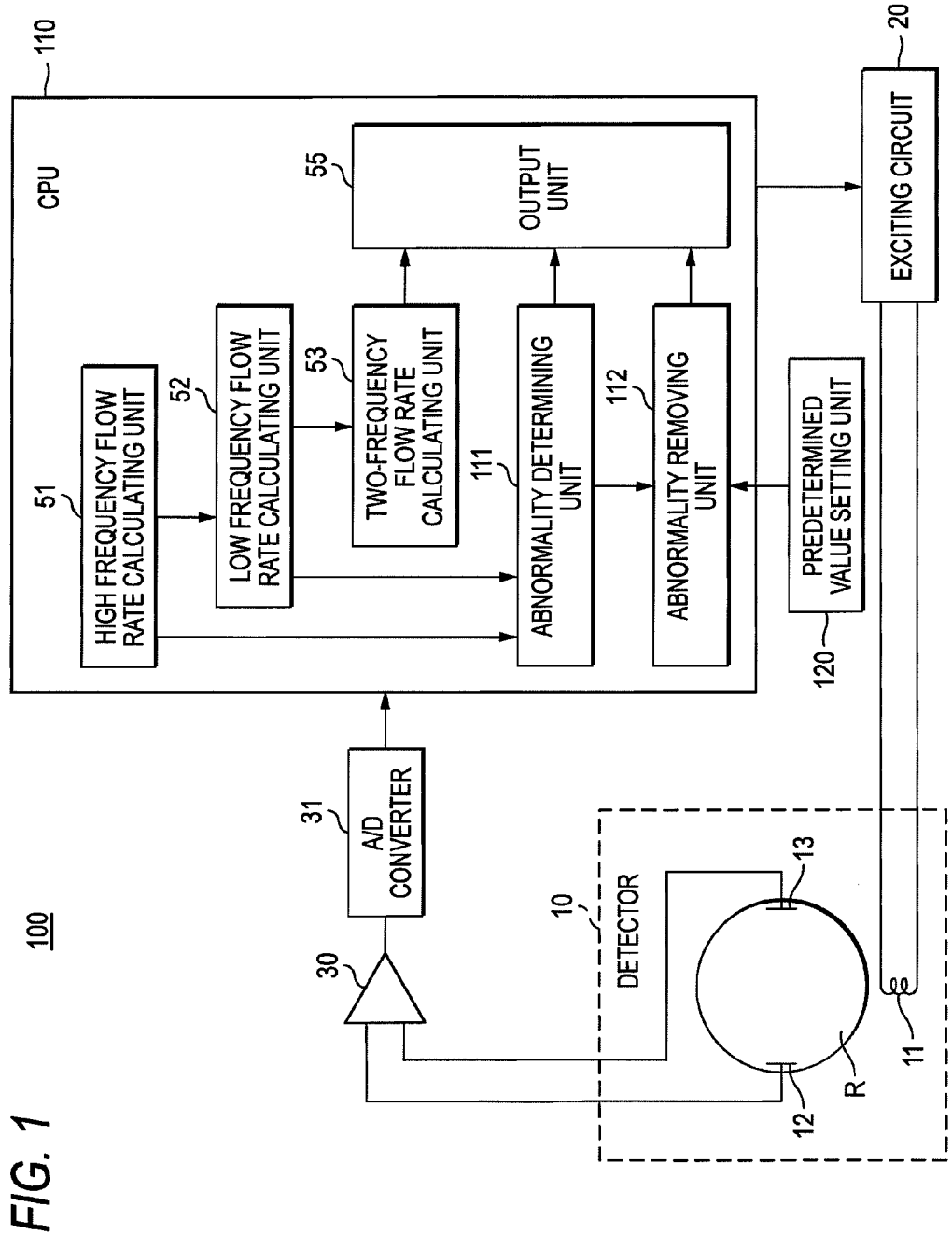
FIG. 1 is a diagram illustrating the structure of an electromagnetic flow meter according to an embodiment of the invention.

FIG. 1 is a diagram illustrating the structure of an electromagnetic flow meter 100 according to an embodiment of the invention. In FIG. 1, the same components as those shown in FIG. 8 are denoted by the same reference numerals and a description thereof will be omitted.

Figure 8:
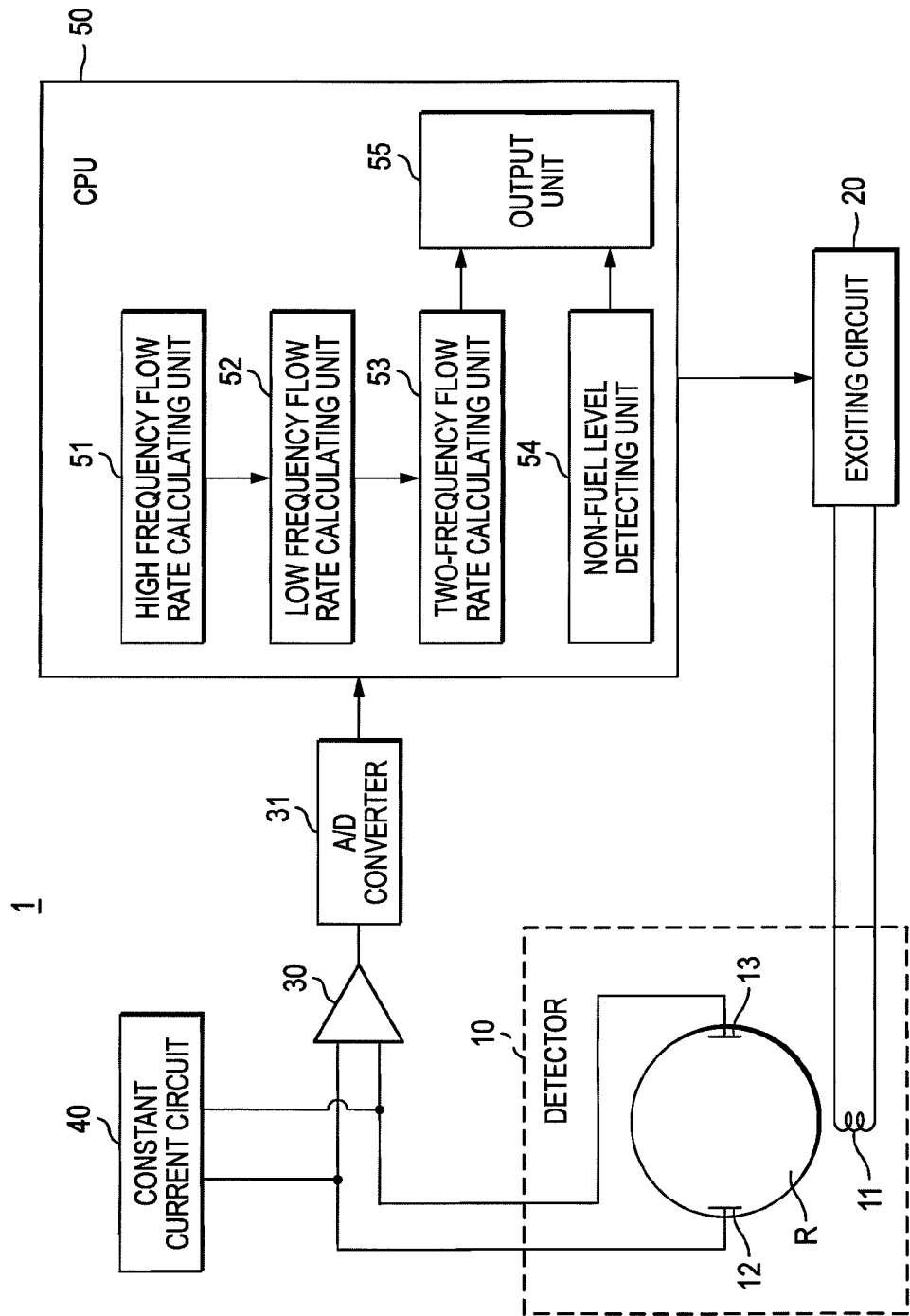
FIG. 8 is a diagram illustrating the structure of an electromagnetic flow meter according to the related art.

In FIG. 1, the electromagnetic flow meter 100 differs from the electromagnetic flow meter shown in FIG. 8 in that it includes a predetermined value setting unit 120 and a CPU 110 includes an abnormality detecting unit 111 and an abnormality removing unit 112 instead of the non-full level detecting unit 54 (see FIG. 8).

The abnormality detecting unit 111 receives flow rates from a high frequency flow rate calculating unit 51 and a low frequency flow rate calculating unit 52 and determines whether a fluid is in an abnormal state, such as at a non-full level.

The abnormality removing unit 112 receives the determination result from the abnormality detecting unit 111 and the flow rates from the high frequency flow rate calculating unit 51 and the low frequency flow rate calculating unit 52, and removes the abnormal state.

A predetermined value setting unit 120 sets a predetermined value input from, for example, the user to a predetermined value used by the abnormality removing unit 112.

Next, the operation of the electromagnetic flow meter 100 determining and removing abnormality will be described with reference to FIGS. 2 and 3.

First, the operation will be described with reference to FIGS. 2A to 2I. FIGS. 2A to 2I are timing chart illustrating the flow rate of the electromagnetic flow meter 100, a removal flag, the operation of a timer, and an output at a full level and a non-full level.

FIG. 2A shows the state of a fluid R to be measured at the full level and at the non-full level, FIG. 2B shows a low frequency flow rate eL, FIG. 2C shows a high frequency flow rate eH, FIG. 2D shows a low frequency low-pass filtered flow rate FL, FIG. 2E shows a high frequency low-pass filtered flow rate FH, FIG. 2F shows a removal flag (described in FIGS. 3A and 3B), FIG. 2G shows a timer (described in FIGS. 3A and 3B), FIG. 2H shows an abnormal/normal state (described in FIGS. 3A and 3B) indicating an abnormal or normal state, and FIG. 2I shows a current or a voltage output from an output unit 55 (hereinafter, referred to as a 'current output').

In FIG. 2A, the fluid R to be measured is at a full level up to a time t1, at a non-full level during the period from the time t1 to a time t2, and at a full level after the time t2.

In FIGS. 2B and 2C, the low frequency flow rate eL(b) and the high frequency flow rate eH(c) are described on the same vertical axis.

Up to the time t1, the low frequency flow rate eL(b) and the high frequency flow rate eH(c) have substantially the same value. During the period from the time t1 to the time t2, the low frequency flow rate eL(b) and the high frequency flow rate eH(c) are increased, maintained to be constant, and decreased. The low frequency flow rate eL(b) is more than the high frequency flow rate eH(c) and the difference between the low frequency flow rate eL(b) and the high frequency flow rate eH(c) is increased when the low frequency flow rate eL(b) and the high frequency flow rate eH(c) are increased.

After the time t2, the low frequency flow rate eL(b) and the high frequency flow rate eH(c) return to substantially the same value.

In FIGS. 2D and 2E, the low frequency low-pass filtered flow rate FL(d) and the high frequency low-pass filtered flow rate FH(e) are described on the same vertical axis.

Up to the time t1, the low frequency low-pass filtered flow rate FL(d) and the high frequency low-pass filtered flow rate FH(e) have substantially the same value. During the period from the time t1 to the time t2, the low frequency low-pass filtered flow rate FL(d) and the high frequency low-pass filtered flow rate FH(e) are increased, maintained to be constant, and decreased. The low frequency low-pass filtered flow rate FL(d) is more than the high frequency low-pass filtered flow rate FH(e) and the difference between the low frequency low-pass filtered flow rate FL(d) and the high frequency low-pass filtered flow rate FH(e) is increased when the low frequency low-pass filtered flow rate FL(d) and the high frequency low-pass filtered flow rate FH(e) are increased.

The low frequency low-pass filtered flow rate FL(d) and the high frequency low-pass filtered flow rate FH(e) are obtained by performing a low-pass filtering operation (for example, low-pass filtering) on the low frequency flow rate eL(b) and the high frequency flow rate eH(c), respectively.

Therefore, the gradients of the low frequency low-pass filtered flow rate FL(d) and the high frequency low-pass filtered flow rate FH(e) when they are increased and decreased are less than those of the low frequency flow rate eL(b) and the high frequency flow rate eH(c). However, during the period from the time t2 to the time t3, the low frequency low-pass filtered flow rate FL(d) and the high frequency low-pass filtered flow rate FH(e) return to substantially the same value.

FIGS. 2F to 2I will be described below with reference to FIGS. 3A and 3B on the basis of the operations of FIGS. 2A to 2E.

The states of FIGS. 2F to 2I up to the time t1 are as follows. The removal flag (f) is cleared (value '0'), the timer (g) is in a state in which a predetermined time (first predetermined time) has elapsed, the abnormal/normal state (h) is a normal state, and the current output (i) is a current value corresponding to a two-frequency flow rate eA.

Then, FIGS. 3A and 3B will be described. FIG. 3A is a flowchart illustrating an abnormality determining process and FIG. 3B is a flowchart illustrating an abnormality removing process.

Figure 3A:
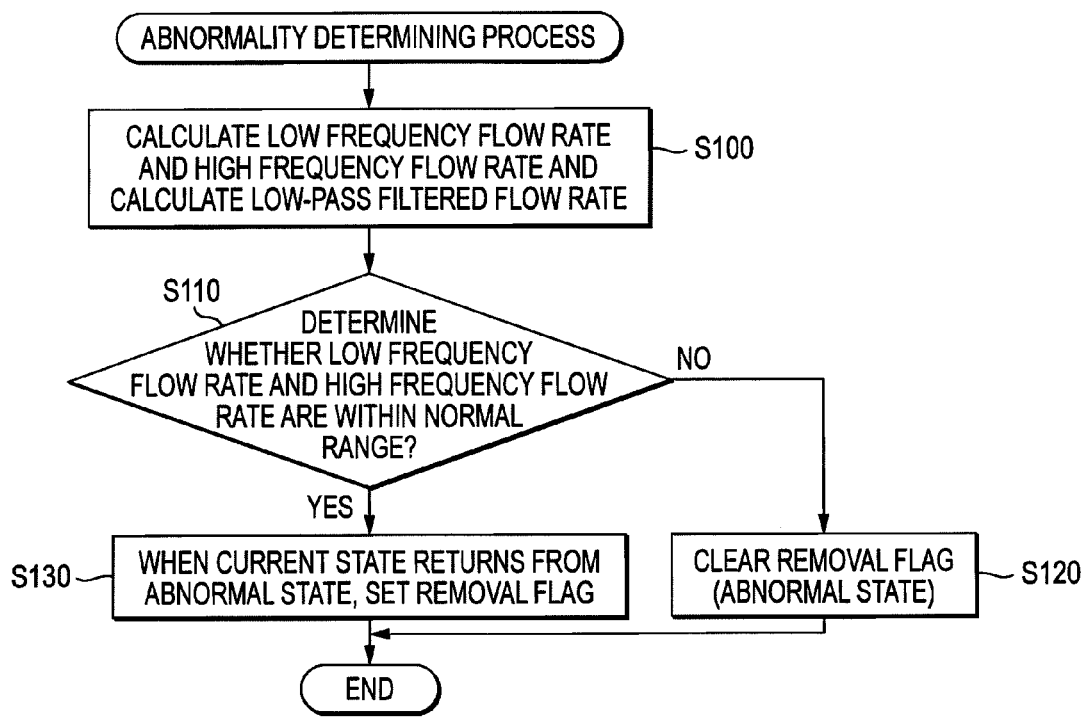
FIGS. 3A and 3B are flowchart illustrating an abnormality determining process (a) and an abnormality removing process (b) of the electromagnetic flow meter shown in FIG. 1.

In Step S100 of FIG. 3A, the low frequency flow rate calculating unit 52 calculates the low frequency flow rate eL and the low frequency low-pass filtered flow rate FL. The high frequency flow rate calculating unit 51 calculates the high frequency flow rate eH and the high frequency low-pass filtered flow rate FH.

In Step S110, the abnormality detecting unit 111 compares the low frequency flow rate eL with a normal range (predetermined range). If the low frequency flow rate eL is out of the normal range ('No' in Step S110), the process proceeds to Step S120. The removal flag is cleared and it is determined that the current state is the abnormal state.

Figure 3B:
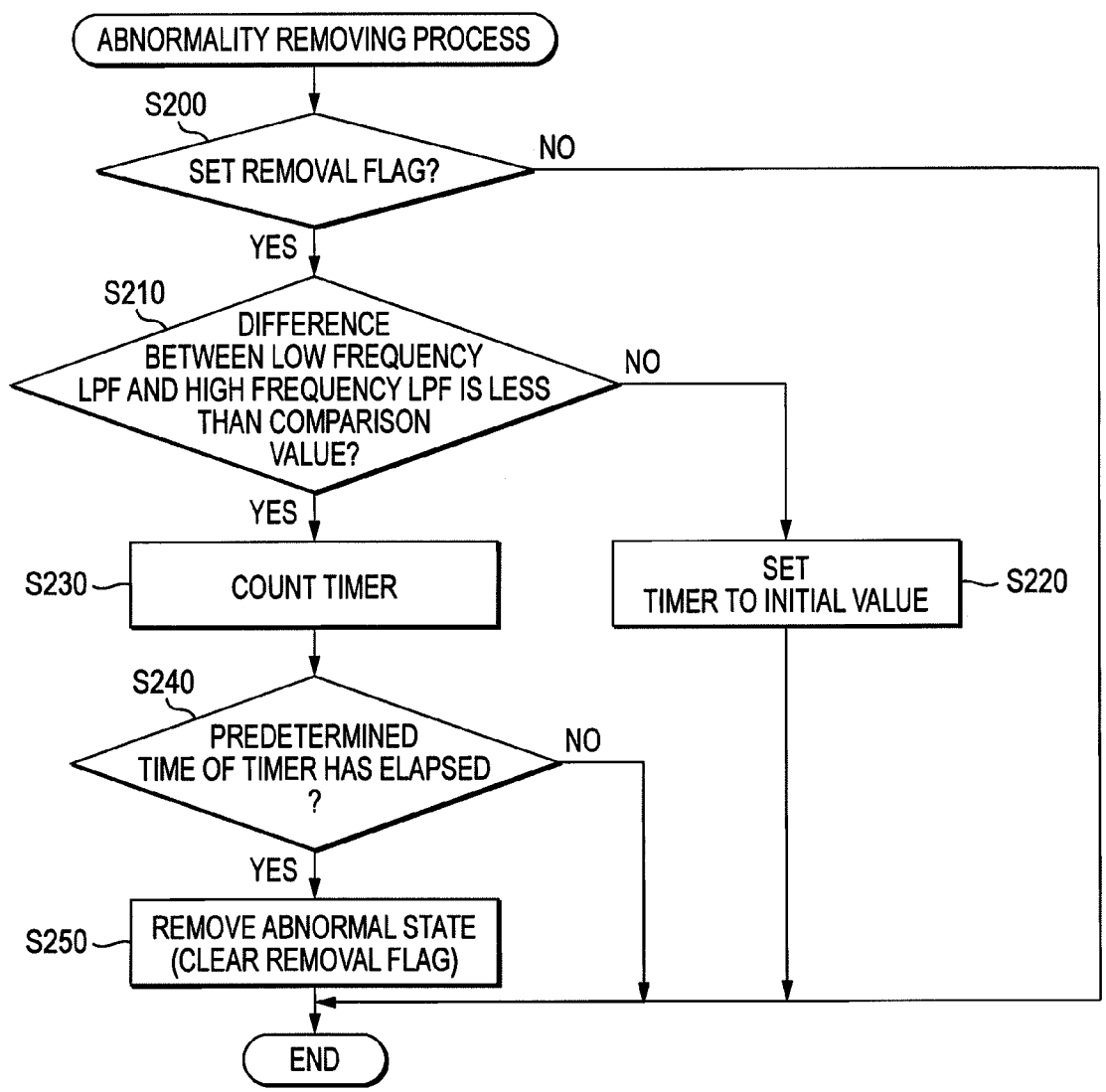

Then, Step S200 in the abnormality removing process shown in FIG. 3B is performed. The abnormality removing unit 112 determines whether the removal flag is set. Since the removal flag is cleared ('No' in Step S260), the abnormality removing process ends.

In FIGS. 2A to 2I, the low frequency flow rate eL(b) is out of the normal range in a short time after the time t1. Therefore, at that time, the removal flag (f) is maintained in the cleared state, the timer (g) is maintained in the state in which a predetermined time has elapsed, the abnormal/normal state (h) is the abnormal state, and the current output (i) is in an abnormal state, which results in burnout. This state is maintained immediately before the time t2.

In Step S110 of FIG. 3A, the high frequency flow rate eH is compared with the normal range. When the high frequency flow rate eH is out of the normal range, the process proceeds to Step S120. In addition, each of the low frequency flow rate eL and the high frequency flow rate eH may be compared with the normal range. When both the low frequency flow rate eL and the high frequency flow rate eH are out of the normal range, the process may proceed to Step S120.

For simplicity of description, in Step S110, the low frequency flow rate eL is compared with the normal range. For example, the normal range is a flow rate range in which the electromagnetic flow meter 100 can accurately measure the flow rate.

In a short time after the time t2 in FIGS. 2A to 2I, the low frequency flow rate eL(b) is within the normal range. Therefore, the abnormality determining process shown in FIG. 3A proceeds to Step S130 without determining that the current state is an abnormal state ('Yes' in Step S110).

In Step S130, the abnormality detecting unit 111 sets the removal flag (value '1') at the time when the process proceeds from the abnormal state in Step S120 to Step S130.

Then, Step S200 in the abnormality removing process shown in FIG. 3B is performed. Since the removal flag is set ('Yes' in Step S200), the process proceeds to Step S210.

In Step S210, the abnormality removing unit 112 compares the absolute value of the difference between the low frequency low-pass filtered flow rate FL and the high frequency low-pass filtered flow rate FH with a comparison value (predetermined value). If the absolute value of the difference is equal to or more than the comparison value ('No' in Step S210), the process proceeds to Step S220.

In Step S220, the abnormality removing unit 112 sets the value of the timer to an initial value (for example, value '0'), and the abnormality removing process ends.

Therefore, in FIGS. 2A to 2I, in a short time after the time t2, the low frequency flow rate eL(b) is within the normal range, and the absolute value of the difference between the low frequency low-pass filtered flow rate FL and the high frequency low-pass filtered flow rate FH is more than the comparison value. Therefore, the removal flag (f) is set, the timer (g) is set to the initial value, the abnormal/normal state (h) is maintained in the abnormal state, and the current output (i) is maintained in a burnout state. This state is maintained up to the time t3.

The fluid to be measured reaches the full level at the time t2, but the flow and the full level state of the fluid to be measured are unstable between the time t2 and the time t3. In this case, at the time t2, when the abnormal state is immediately changed to the normal state, the normal state and the abnormal state are alternated due to the instability of the fluid at the full level, and hunting occurs in the current output. The following operation is performed to prevent the hunting.

At the time t3, since the difference between the low frequency low-pass filtered flow rate FL(d) and the high frequency low-pass filtered flow rate FH(e) is less than the comparison value in FIGS. 2A to 2I, the abnormality removing process shown in FIG. 3B proceeds to Step S230 ('Yes' in Step S210).

In Step S230, the abnormality removing unit 112 counts the value of the timer and increases the value.

In Step S240, the abnormality removing unit 112 determines whether a predetermined time (first predetermined time) of the timer has elapsed. For example, the abnormality removing unit 112 compares the value of the timer with a predetermined threshold value. When the value of the timer is equal to or less than the threshold value, the abnormality removing unit 112 determines that the predetermined time has not elapsed ('No' in Step S240), and the abnormality removing process ends.

Therefore, in FIGS. 2A to 2I, during the period from the time t3 to the time t4, since the value of the timer (g) is less than the predetermined threshold value, the removal flag (f) is maintained in the set state, the timer (g) counts the time, the abnormal/normal state (h) is maintained in the abnormal state, and the current output (i) is maintained in the burnout state.

At the time t4, since the value of the timer (g) is equal to or more than the predetermined threshold value and a predetermined time has elapsed, the abnormality removing process shown in FIG. 3B proceeds to Step S250 ('Yes' in Step S240).

In Step S250, the abnormality removing unit 112 removes the abnormal state and clears the removal flag. Then, the abnormality removing process ends.

Therefore, in FIGS. 2A to 2I, after the time t4, since the value of the timer (g) is more than the predetermined threshold value and the predetermined time has elapsed, the removal flag (f) is cleared, the timer (g) is in the state in which the predetermined time has elapsed, the abnormal/normal state (h) is the normal state (removal of abnormality), and the current output (i) is a current value corresponding to the two-frequency flow rate eA.

For example, since the difference between the low frequency low-pass filtered flow rate FL(d) and the high frequency low-pass filtered flow rate FH(e) is less than the comparison value, the predetermined time (first predetermined time) may be the time until the flow and the full level state of the fluid to be measured are sufficiently stabilized.

The abnormality determining process and the abnormality removing process have been described above.

According to this embodiment, when at least one of the low frequency flow rate eL and the high frequency flow rate eH is out of the normal range, the abnormality detecting unit 111 determines that the fluid is in an abnormal state. When the flow rates are within the normal range and it is determined that the fluid is not in the abnormal state, the abnormality removing unit 112 removes the abnormal state after the difference between the low frequency low-pass filtered flow rate FL and the high frequency low-pass filtered flow rate FH is less than the comparison value and a predetermined time has elapsed. In this way, it is possible to accurately detect the abnormal state, that is, the non-full level of the fluid to be measured and thus prevent output hunting. In addition, it is possible to rapidly detect the abnormal state, that is, the non-full level using the method of using an AC coupling circuit to make a constant current flow according to the related art.

Even when noise is intermittently mixed and the low frequency flow rate eL and the high frequency flow rate eH vary (are suddenly changed), it is possible to prevent the variation in the low frequency low-pass filtered flow rate FL and the high frequency low-pass filtered flow rate FH using low-pass filtering. Therefore, it is possible to prevent an operation error due to noise by removing the abnormal state using the low frequency low-pass filtered flow rate FL and the high frequency low-pass filtered flow rate FH.

In Step S210 of FIG. 3B, when the difference between the low frequency low-pass filtered flow rate FL and the high frequency low-pass filtered flow rate FH is less than the comparison value ('Yes' in Step S210), the abnormal state may be removed in Step S250 without waiting for the elapse of a predetermined time (that is, without performing Steps S230 and 240).

In this way, at the time t3 in FIGS. 2A to 2I, the abnormal state is removed and it is possible to more rapidly return to the normal state.

The predetermined value setting unit 120 may change the comparison value (predetermined value) used by the abnormality removing unit 112. In this case, for example, the user can change the comparison value to a value at which the non-full level can be effectively detected on the basis of, for example, the flow state of the fluid to be measured. For example, the comparison value may be set to a value corresponding to the percentage (%) of a flow rate span.

(Second Embodiment)

In FIGS. 2A to 2I, at the non-full level, when the difference between the low frequency low-pass filtered flow rate FL(d) and the high frequency low-pass filtered flow rate FH(e) is excessively large or when a time constant used for the low-pass filtering is excessively large, it takes a long time for the difference between the low frequency low-pass filtered flow rate FL(d) and the high frequency low-pass filtered flow rate FH(e) to be less than the comparison value.

That is, the period from the time t2 to the time t3 is increased. As a result, the time until the abnormal state is removed at the time t4 is increased. This embodiment is for significantly reducing the time.

Figure 4:
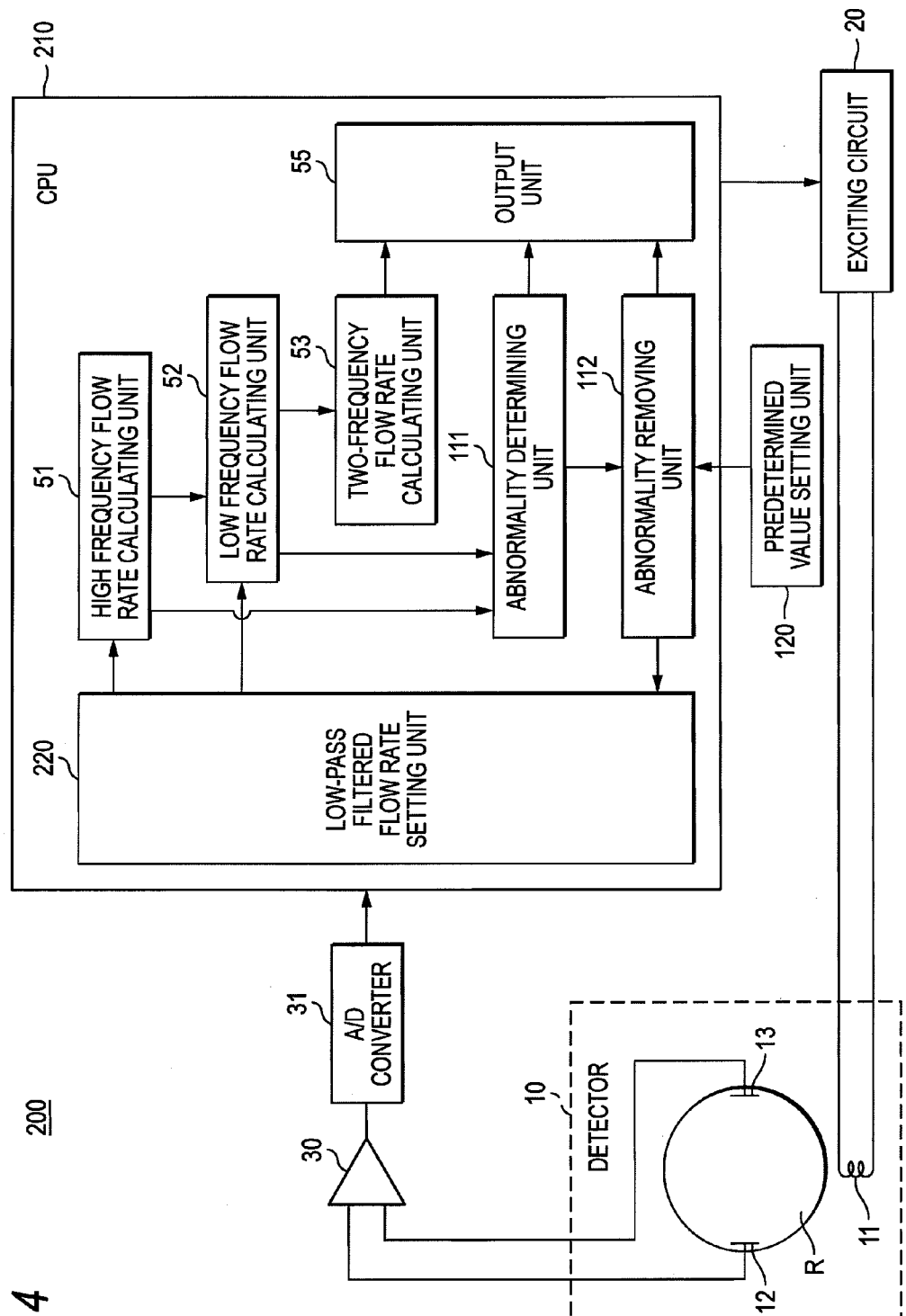
FIG. 4 is a diagram illustrating the structure of an electromagnetic flow meter according to another embodiment of the invention.

The second embodiment when the difference between the low frequency low-pass filtered flow rate FL and the high frequency low-pass filtered flow rate FH is excessively large will be described with reference to FIG. 4. FIG. 4 is a diagram illustrating the structure of an electromagnetic flow meter 200 according to this embodiment. In FIG. 4, the same components as those shown in FIG. 1 are denoted by the same reference numerals and a description thereof will be omitted.

In FIG. 4, the electromagnetic flow meter 200 differs from the electromagnetic flow meter shown in FIG. 1 in that a CPU 210 includes a low-pass filtered flow rate setting unit 220 in addition to the components of the CPU 110 (see FIG. 1).

The low-pass filtered flow rate setting unit 220 receives the process result from the abnormality removing unit 112 and sets the high frequency low-pass filtered flow rate FH of the high frequency flow rate calculating unit 51 and the low frequency low-pass filtered flow rate FL of the low frequency flow rate calculating unit 52.

Figure 5:
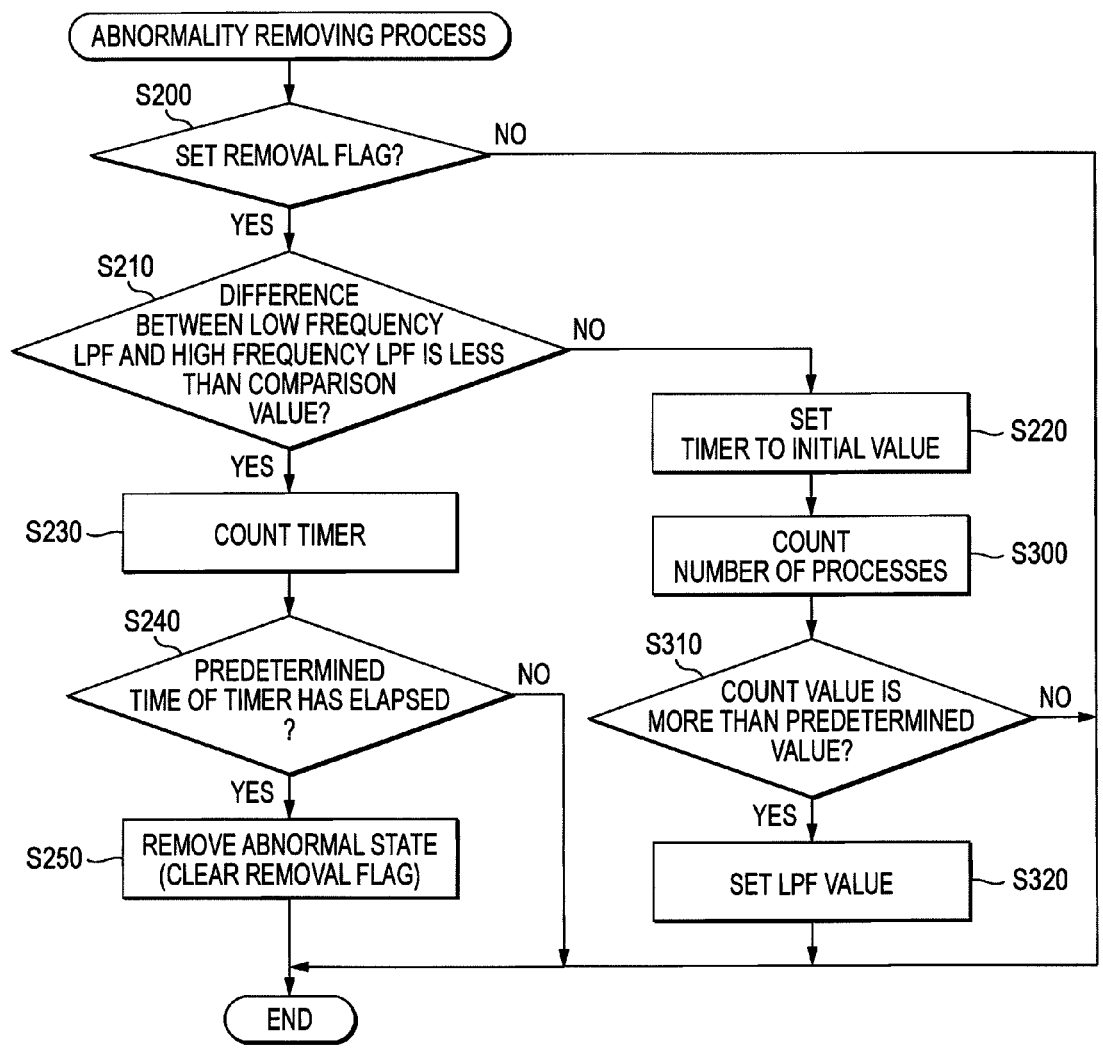
FIG. 5 is a flowchart illustrating an abnormality removing process of the electromagnetic flow meter shown in FIG. 4.

The operation of the low-pass filtered flow rate setting unit 220 will be described with reference to FIG. 5. FIG. 5 is a flowchart illustrating an abnormality removing process including the operation of the low-pass filtered flow rate setting unit 220. In FIG. 5, the same components as those shown in FIG. 3B are denoted by the same reference numerals and a description thereof will be omitted.

In Step S210 of FIG. 5, the absolute value of the difference between the low frequency low-pass filtered flow rate FL and the high frequency low-pass filtered flow rate FH is more than a comparison value ('No' in Step S210) and the abnormal state is not removed. The process proceeds to Step S220. Here, the process after the time t2 in FIGS. 2A to 2I will be described.

The abnormality removing unit 112 sets the value of the timer to an initial value (Step S220). Then, the abnormality removing unit 112 counts the number of times Step S220 is performed with the timer and increases the value in Step S300.

In Step S310, the low-pass filtered flow rate setting unit 220 receives the count value and determines whether the value is more than a predetermined threshold value. If it is determined that the value is equal to or less than the threshold value ('No' in Step S310), the abnormality removing process ends.

If it is determined that the value is equal to or more than the threshold value ('Yes' in Step S310), the process proceeds to Step S320. That is, after a second predetermined time has elapsed in Step S310, the process proceeds to Step S320. In addition, a timer different from that in the first embodiment, not the counter, may be used to determine whether the second predetermined time has elapsed.

In Step S320, the low-pass filtered flow rate setting unit 220 sets the current high frequency flow rate eH to the high frequency low-pass filtered flow rate FH and the current low frequency flow rate eL to the low frequency low-pass filtered flow rate FL.

Since the current high frequency flow rate eH and the current low frequency flow rate eL have substantially the same value, the absolute value of the difference between the set low frequency low-pass filtered flow rate FL and the set high frequency low-pass filtered flow rate FH is less than the comparison value. Therefore, the determination result of Step S210 which will be performed after this process is 'Yes' and the abnormal state is removed in Step S250 after a predetermined time (first predetermined time) has elapsed.

This operation will be described with reference to FIGS. 2A to 2I. When the period from the time t2 to a time t3a in FIGS. 2A to 2I is referred to as the second predetermined time, the timer (g) starts to count the time at the time t3a. That is, the time t3 is advanced to the time t3a.

At a time t4a, the predetermined time (first predetermined time) of the timer (g) has elapsed, the removal flag (f) is cleared, the abnormal/normal state (h) is a normal state (removal of an abnormal state), and the current output (i) is a current value corresponding to the two-frequency flow rate eA. That is, the time t4 is advanced to the time t4a.

According to this embodiment, when the abnormal state is not removed, the low-pass filtered flow rate setting unit 220 sets the current high frequency flow rate eH to the high frequency low-pass filtered flow rate FH and the current low frequency flow rate eL to the low frequency low-pass filtered flow rate FL after the second predetermined time has elapsed. In this way, the time until the abnormal state is removed is reduced and it is possible to rapidly change the current state to the normal state.

Figure 6:
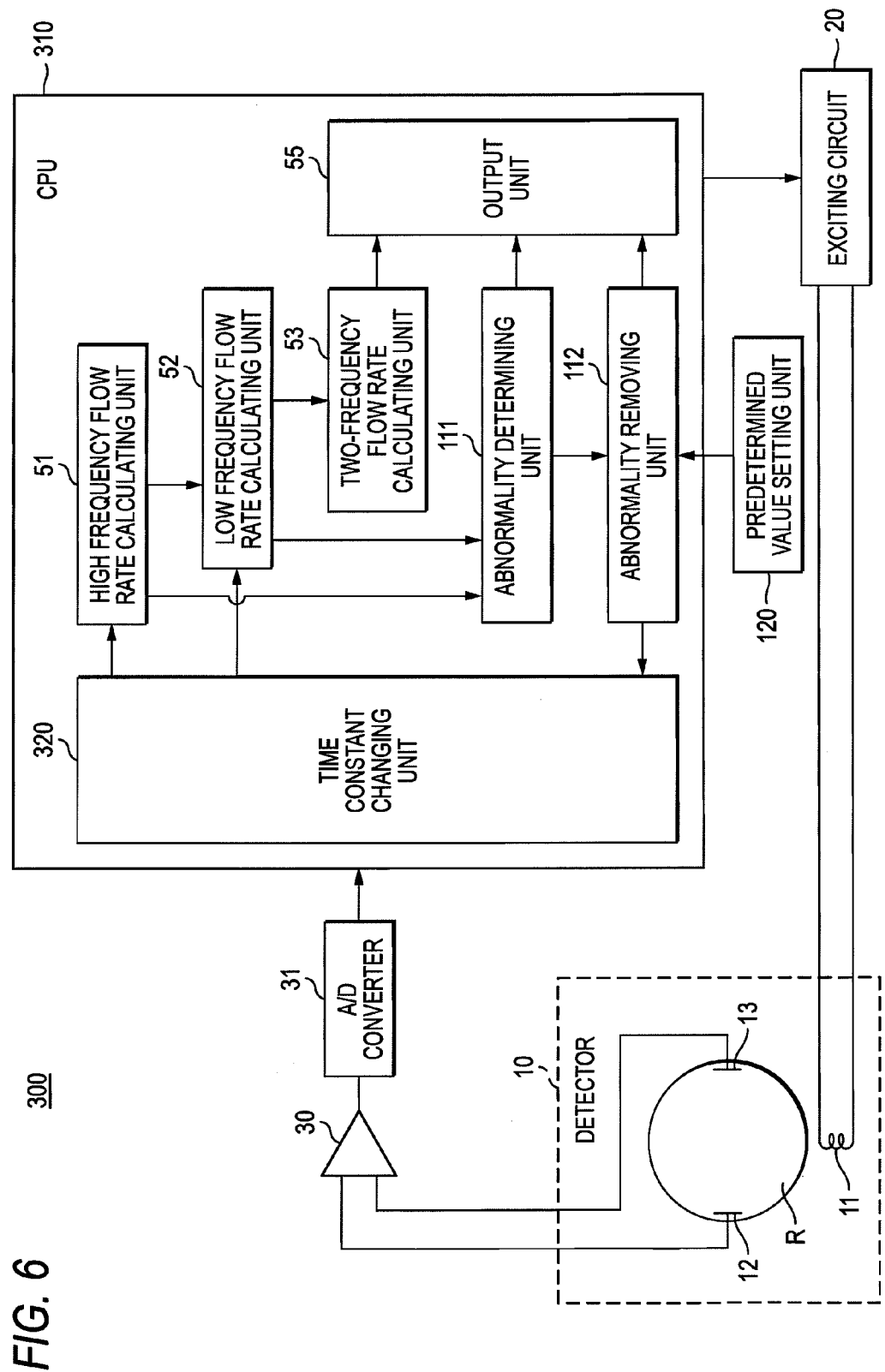
FIG. 6 is a diagram illustrating the structure of an electromagnetic flow meter according to still another embodiment of the invention.

Next, an embodiment when a time constant used in low-pass filtering is excessively large will be described with reference to FIG. 6. FIG. 6 is a diagram illustrating the structure of an electromagnetic flow meter 300 according to this embodiment. In FIG. 6, the same components as those shown in FIG. 1 are denoted by the same reference numerals and a description thereof will be omitted.

In FIG. 6, the electromagnetic flow meter 300 differs from the electromagnetic flow meter shown in FIG. 1 in that a CPU 310 includes a time constant changing unit 320 in addition to the components of the CPU 110 (see FIG. 1).

The time constant changing unit 320 receives the process result from the abnormality removing unit 112, and changes a time constant used in the calculation of the high frequency low-pass filtered flow rate by the high frequency flow rate calculating unit 51 and a time constant used in the calculation of the low frequency low-pass filtered flow rate by the low frequency flow rate calculating unit 52.

Figure 7:
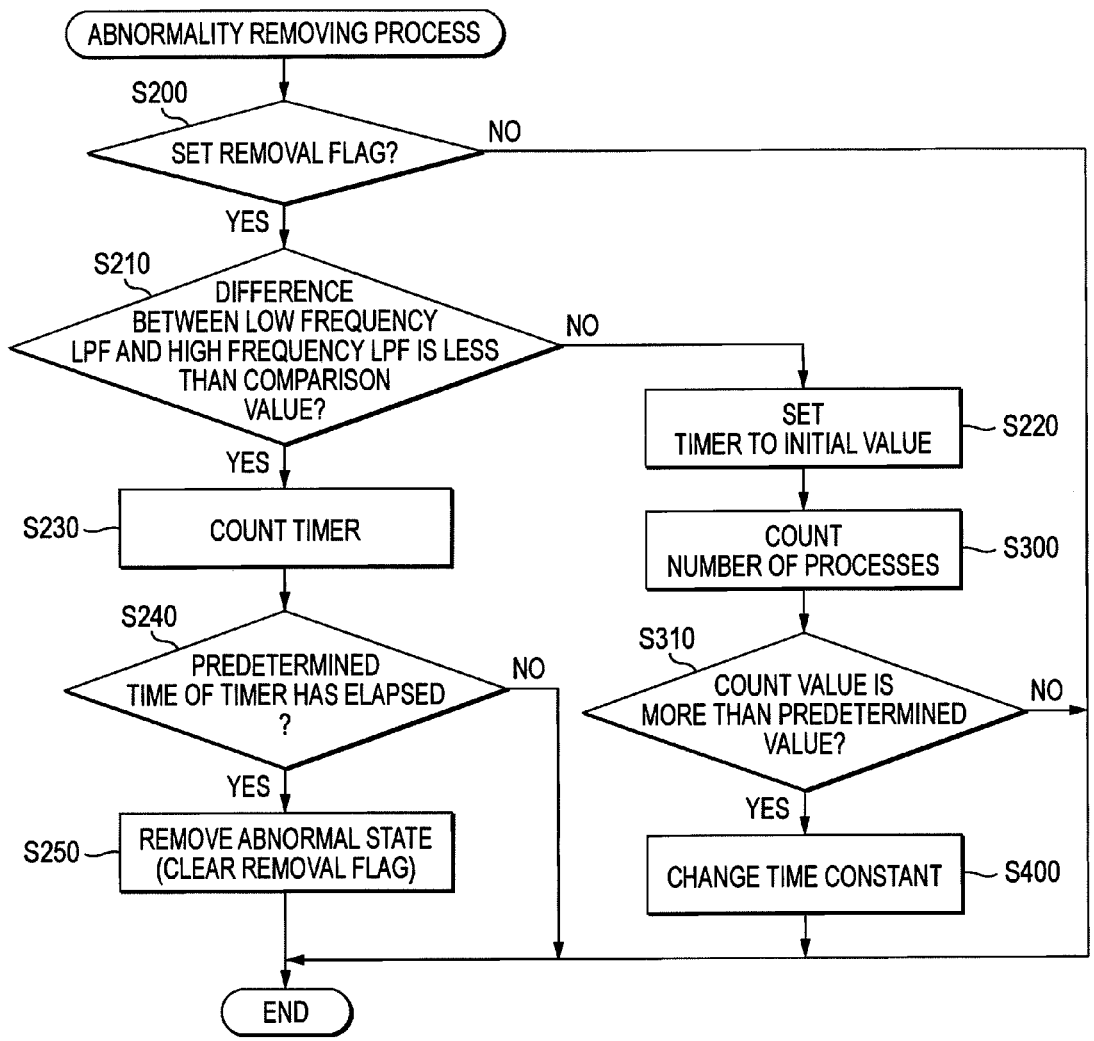
FIG. 7 is a flowchart illustrating an abnormality removing process of the electromagnetic flow meter shown in FIG. 6.

Next, the operation of the time constant changing unit 320 will be described with reference to FIG. 7. FIG. 7 is a flowchart illustrating an abnormality removing process including the operation of the time constant changing unit 320. In FIG. 7, the same components as those shown in FIG. 3B are denoted by the same reference numerals and a description thereof will be omitted.

In Step S210 of FIG. 7, the absolute value of the difference between the low frequency low-pass filtered flow rate FL and the high frequency low-pass filtered flow rate FH is more than a comparison value ('No' in Step S210) and the abnormal state is not removed. Therefore, process proceeds to Step S220. Here, the process after the time t2 in FIGS. 2A to 2I will be described.

The abnormality removing unit 112 sets the value of the timer to an initial value (Step S220). Then, the abnormality removing unit 112 counts the number of times Step S220 is performed with the timer and increases the value in Step S300.

In Step S310, the time constant changing unit 320 receives the count value and determines whether the value is more than a predetermined threshold value. If it is determined that the value is equal to or less than the threshold value ('No' in Step S310), the abnormality removing process ends.

If it is determined that the value is equal to or more than the threshold value ('Yes' in Step S310), the process proceeds to Step S400. That is, after a third predetermined time has elapsed in Step S310, the process proceeds to Step S400. In addition, a timer different from that in the first embodiment, not the counter, may be used to determine whether the third predetermined time has elapsed.

In Step S400, the time constant changing unit 320 reduces the time constants used in the calculation of the high frequency low-pass filtered flow rate and the calculation of the low frequency low-pass filtered flow rate.

In this way, the low frequency low-pass filtered flow rate FL and the high frequency low-pass filtered flow rate FH rapidly approach (converge on) the same value and the difference therebetween is less than the comparison value. Therefore, the determination result of Step S210 which will be performed after this process is 'Yes' and the abnormal state is removed in Step S250 after a predetermined time (first predetermined time) has elapsed.

This operation will be described with reference to FIGS. 2A to 2I. Similar to the operation of the low-pass filtered flow rate setting unit 220, the time t3 is advanced to the time t3a and the time t4 is advanced to the time t4a.

The second predetermined time and the third predetermined time may be set such that the returning time to the normal state (the removal time of the normal state) is shorter than that in the first embodiment by advancing the time t3 to the time t3a and advancing the time t4 to the time t4a.

According to this embodiment, when the abnormal state is not removed, the time constant changing unit 320 reduces the time constants used in the calculation of the high frequency low-pass filtered flow rate and the calculation of the low frequency low-pass filtered flow rate after the third predetermined time has elapsed. In this way, the time until the abnormal state is removed is reduced and it is possible to more rapidly change the current state to the normal state.

As another embodiment, the method of making a constant current flow or the method of detecting a noise component may be combined with the first embodiment or the second embodiment. In this case, it is possible to detect a non-full level and the constant current circuit 40 is not required, which results in a low cost.

The high frequency flow rate calculating unit 51, the low frequency flow rate calculating unit 52, the two-frequency flow rate calculating unit 53, the abnormality detecting unit 111, the abnormality removing unit 112, the low-pass filtered flow rate setting unit 220, and the time constant changing unit 320 are provided in the CPU 110, 210, or 310 and are executed by a predetermined program. However, they may be implemented by, for example, a logic circuit that is provided separately from the CPU 110, 210, or 310.

In addition, a timer may be provided in the CPU 110, 210, or 310 separately from the timer according to the first embodiment and the counter according to the second embodiment, or it may be independently provided. The removal flag may be stored in a storage unit (not shown) and it may be read from or written to the storage unit.

According to the above-mentioned embodiments of the invention, the two-frequency-excitation-type electromagnetic flow meter determines the abnormal state in which the fluid to be measured is at the non-full level on the basis of at least one of the first flow rate and the second flow rate and removes the abnormal state on the basis of the first low-pass filtered flow rate and the second low-pass filtered flow rate when it is determined that the fluid to be measured is in the abnormal state. In this way, it is possible to accurately and rapidly detect the abnormal state in which the fluid to be measured is at the non-full level and prevent output hunting due to the detection of the non-full level.

The invention is not limited to the above-described embodiments, but various modifications and changes of the invention can be made without departing from the scope and spirit of the invention. In addition, the invention may include combinations other than the above-mentioned combinations of the components.

What is claimed is:

1. An electromagnetic flow meter that applies magnetic fields with a first frequency and a second frequency lower than the first frequency, to a fluid to be measured, calculates a first flow rate on the basis of a signal generated by a first magnetic field with the first frequency, calculates a second flow rate on the basis of a signal generated by a second magnetic field with the second frequency, performs low-pass filtering on the first flow rate to calculate a first low-pass filtered flow rate, and performs low-pass filtering on the second flow rate to calculate a second low-pass filtered flow rate, the electromagnetic flow meter comprising:
   an abnormality detecting unit that detects an abnormal state in which, the fluid to be measured is at non-full level on the basis of at least one of the first flow rate and the second flow rate; and
   an abnormality removing unit that removes an indication of the abnormal state on the basis of the first low-pass filtered flow rate and the second low-pass filtered flow rate, when the abnormality detecting unit does not determine that the fluid to be measured is in the abnormal state.

2. The electromagnetic flow meter according to claim 1, wherein
   the abnormality removing unit removes the indication of the abnormal state when difference between the first low-pass filtered flow rate and the second low-pass filtered flow rate is less than a predetermined value.

3. The electromagnetic flow meter according to claim 2, wherein
   the abnormality removing unit removes the indication of the abnormal state after a first predetermined time has elapsed when difference between the first low-pass filtered flow rate and the second low-pass filtered flow rate is less than the predetermined value.

4. The electromagnetic flow meter according to claim 2, wherein
   the abnormality removing unit changes the predetermined value.

5. The electromagnetic flow meter according to claim 1, further comprising:
   a low-pass filtered flow rate setting unit that sets values to the first low-pass filtered flow rate and the second low-pass filtered flow rate after a second predetermined time has elapsed when the abnormality removing unit does not remove the indication of the abnormal state.

6. The electromagnetic flow meter according to claim 5, wherein
   the low-pass filtered flow rate setting unit sets the first flow rate to the first low-pass filtered flow rate and the second flow rate to the second low-pass filtered flow rate.

7. The electromagnetic flow meter according to claim 1, further comprising:
   a time constant changing unit that changes a time constant used in the low-pass filtering for calculating the first low-pass filtered flow rate and the second low-pass filtered flow rate after a third predetermined time has elapsed when the abnormality removing unit does not remove the indication of the abnormal state.

8. The electromagnetic flow meter according to claim 1, wherein the abnormality detecting unit detects that the fluid to be measured is in the abnormal state when at least one of the first flow rate and the second flow rate is out of a predetermined range.

9. The electromagnetic flow meter according to claim 1, wherein the abnormality removing unit only removes a flag when the detecting unit determines that the fluid is in a normal state.

10. An electromagnetic flow meter that applies magnetic fields with a first frequency and a second frequency lower than the first frequency, to a fluid to be measured, calculates a first flow rate on the basis of a signal generated by a first magnetic field with the first frequency, calculates a second flow rate on the basis of a signal generated by a second magnetic field with the second frequency, performs low-pass filtering on the first flow rate to calculate a first low-pass filtered flow rate, and performs low-pass filtering on the second flow rate to calculate a second low-pass filtered flow rate, the electromagnetic flow meter comprising:
   an electronic control unit, configured with executable programmed logic, to perform:
   detecting an abnormal state in which, the fluid to be measured is at non-full level on the basis of at least one of the first flow rate and the second flow rate; and
   removing an indication of the abnormal state on the basis of the first low-pass filtered flow rate and the second low-pass filtered flow rate, when the abnormality detecting unit does not determine that the fluid to be measured is in the abnormal state.

* * * * *